United States Patent
Tang

(10) Patent No.: US 10,429,835 B2
(45) Date of Patent: Oct. 1, 2019

(54) SURFACE TREATMENT ROBOTIC SYSTEM

(71) Applicant: ECOVACS ROBOTICS CO., LTD., Suzhou (CN)

(72) Inventor: Jinju Tang, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 39 days.

(21) Appl. No.: 15/303,849

(22) PCT Filed: Apr. 14, 2015

(86) PCT No.: PCT/CN2015/076516
§ 371 (c)(1),
(2) Date: Dec. 6, 2016

(87) PCT Pub. No.: WO2015/158242
PCT Pub. Date: Oct. 22, 2015

(65) Prior Publication Data
US 2017/0090471 A1  Mar. 30, 2017

(30) Foreign Application Priority Data
Apr. 14, 2014 (CN) .......................... 2014 1 0149361

(51) Int. Cl.
*G05D 1/00* (2006.01)
*G08C 17/02* (2006.01)
*G05D 1/02* (2006.01)

(52) U.S. Cl.
CPC ......... *G05D 1/0022* (2013.01); *G05D 1/0016* (2013.01); *G05D 1/0033* (2013.01);
(Continued)

(58) Field of Classification Search
USPC .......................................................... 701/2
See application file for complete search history.

(56) References Cited

U.S. PATENT DOCUMENTS 5,043,646 A    8/1991  Smith, III et al.
5,461,292 A *  10/1995 Zondlo .................. G01S 13/74
                                                      180/169
(Continued)

FOREIGN PATENT DOCUMENTS

CN    101604153 A    12/2009
CN    102591342 A     7/2012
(Continued)

OTHER PUBLICATIONS

English translation of CN103092205 A.*
(Continued)

*Primary Examiner* — Jean Paul Cass
(74) *Attorney, Agent, or Firm* — Pergament & Cepeda LLP; Miliagros A. Cepeda; Edward D. Pergament

(57) ABSTRACT

A surface treatment robotic system configured to determine direction references by providing different direction sensors in different surface treatment robots, the surface treatment robotic system comprising a surface treatment robot and a remote control; the surface treatment robot comprises a control unit and a drive unit; the control unit receives remote control instructions of the remote control and controls the drive unit to execute corresponding actions; the surface treatment robot is provided with a direction sensor for determining a reference direction; the direction sensor is coupled to the control unit; and the direction sensor transmits the determined reference direction to the control unit, and the control unit determines a walking direction of the robot by referring to the reference direction and according to the remote control instructions inputted by the input terminal of the remote control.

4 Claims, 2 Drawing Sheets

Figure 1:
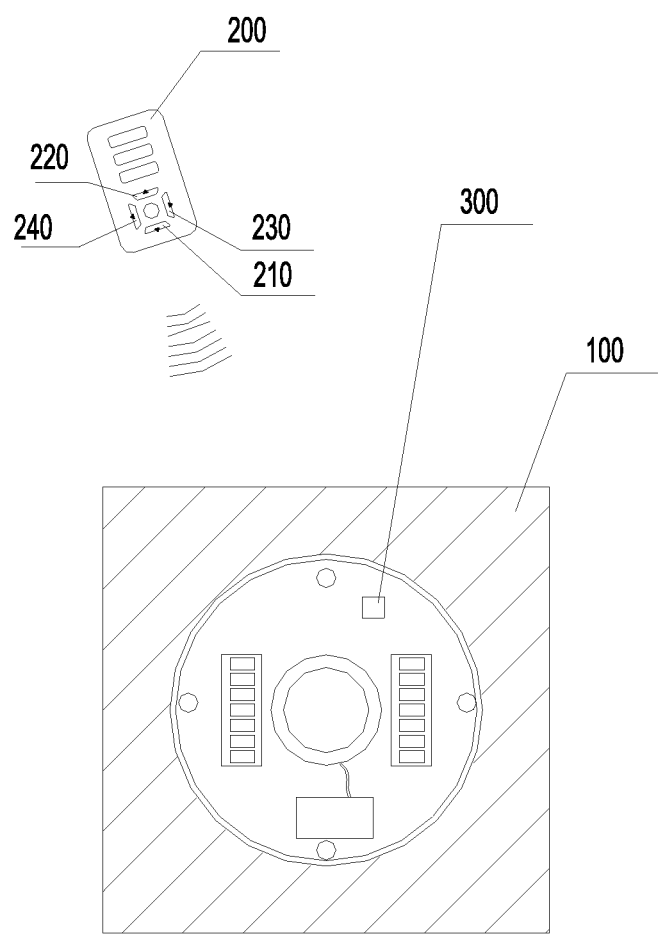

(52) U.S. Cl.
CPC .............. *G05D 1/027* (2013.01); *G08C 17/02* (2013.01); *G05D 2201/0203* (2013.01); *G05D 2201/0216* (2013.01)

(56) References Cited

U.S. PATENT DOCUMENTS

| | | | | |
|---|---|---|---|---|
| 6,232,735 | B1* | 5/2001 | Baba | B25J 9/1689 |
| | | | | 318/567 |
| 6,459,955 | B1* | 10/2002 | Bartsch | A47L 9/00 |
| | | | | 700/245 |
| 8,688,375 | B2* | 4/2014 | Funk | G01C 21/165 |
| | | | | 340/995.19 |
| 9,278,690 | B2* | 3/2016 | Smith | B60W 30/09 |
| 9,427,127 | B2* | 8/2016 | Dooley | A47L 11/125 |
| 2005/0287038 | A1 | 12/2005 | Dubrovsky et al. | |
| 2006/0112754 | A1* | 6/2006 | Yamamoto | A61B 5/1116 |
| | | | | 73/1.38 |
| 2008/0190953 | A1* | 8/2008 | Mallett | A61L 11/00 |
| | | | | 221/13 |
| 2008/0266254 | A1 | 10/2008 | Robbins et al. | |
| 2009/0166102 | A1* | 7/2009 | Waibel | B08B 1/008 |
| | | | | 180/7.1 |
| 2012/0075672 | A1* | 3/2012 | Oishi | G06F 3/1204 |
| | | | | 358/1.15 |
| 2012/0077515 | A1* | 3/2012 | Oishi | H04W 4/023 |
| | | | | 455/456.1 |
| 2013/0082922 | A1* | 4/2013 | Miller | G06F 3/017 |
| | | | | 345/156 |
| 2014/0277744 | A1* | 9/2014 | Coenen | B25J 9/163 |
| | | | | 700/264 |

FOREIGN PATENT DOCUMENTS

| | | |
|---|---|---|
| CN | 202771261 U | 3/2013 |
| CN | 103092205 A | 5/2013 |
| CN | 103177545 A | 6/2013 |
| CN | 203070099 U | 7/2013 |
| CN | 103592944 A | 2/2014 |
| CN | 203812090 U | 9/2014 |

OTHER PUBLICATIONS

International Search Report dated Jul. 15, 2015, for corresponding International Patent Application No. PCT/CN2015/076516. (With English Translation).

Written Opinion dated Jul. 15, 2015, for corresponding International Patent Application No. PCT/CN2015/076516. (With English Translation).

International Preliminary Report on Patentability dated Oct. 18, 2016, for corresponding International Patent Application No. PCT/CN2015/076516.

Extended European Search Report (EESR) dated Nov. 22, 2017, for corresponding European Patent Application No. EP 15 77 9201.

Second Office Action dated Nov. 29, 2017, for corresponding Chinese Patent Application No. CN 201410149361.2.

\* cited by examiner

SURFACE TREATMENT ROBOTIC SYSTEM

This application is a National Phase application under 35 U.S.C. 371 of International Application No. PCT/CN2015/076516, filed on Apr. 14, 2015, which claims priority to Chinese provisional application No. 201410149361.2, filed on Apr. 14, 2014, all of which are hereby incorporated by references in their entireties.

FIELD OF THE INVENTION

The present invention relates to a surface treatment robotic system, which belongs to the technical field of small appliance manufacturing.

BACKGROUND ART

Generally, the existed surface treatment robotic system comprises a surface robot and a remote controller. Typically, a remote controller of a window cleaning robot, for example, is provided with front, back, left and right buttons. Such window cleaning robot, which is controlled by the remote controller, normally does not have the function of direction recognition. In the conventional control mode, if the window cleaning robot is intended to adjust its walking direction to walk to the left in its walking-up state, it needs to, firstly, press a button for steering to left until the front end of the window cleaning robot has turned to the horizontal direction, and then press the front button. That is, the existed control method achieves the walking of the robot completely based on visual observation and manual control by means of the remote controller without determining the walking direction of the robot. Therefore, the existed surface treatment robotic system has a high degree of manual intervention and a complicated manipulation, and the remote control efficiency is low.

SUMMARY OF THE INVENTION

In view of the deficiencies in the prior art, the present invention aims to provide a surface treatment robotic system, which is configured to determine direction references by providing different direction sensors in different surface treatment robots and then determine at least four walking directions of the surface treatment robot based on the direction references, and to enable the buttons on the remote controller to correspond one-to-one to the walking directions of the surface treatment robot. When a short or long pressing is applied to any button on the remote controller, the robot may automatically adjust to walk in a corresponding direction regardless of the motion state of the surface treatment robot. The manipulation thereof is convenient and the working efficiency thereof is high.

The technical problem to be solved in the present invention is solved by the following technical solutions:

A surface treatment robotic system comprises a surface treatment robot and a remote controller, wherein the surface treatment robot comprises a control unit and a driving unit; the control unit receives remote control instructions from the remote controller and controls the driving unit to perform corresponding actions; the surface treatment robot is provided with a direction sensor for determining a reference direction; the direction sensor is coupled to the control unit, and the direction sensor transmits the determined reference direction to the control unit; and the control unit determines a walking direction of the robot by referring to the reference direction and according to the remote control instructions input by an input terminal of the remote controller.

The input terminal for inputting the instructions of the remote controller comprises at least four direction buttons configured to input the respective remote control instructions, the remote control instructions being corresponding one-to-one to four walking directions, including the front, the back, the left, and the right walking directions set based on the reference direction, of the surface treatment robot.

In different surface treatment robotic systems, the determination of the reference direction may be achieved by providing different direction sensors.

For example, the surface treatment robot is a tilted surface treatment robot and the direction sensor is a gravity sensor through which a vertical direction is determined as the reference direction.

The remote control instructions comprise an instruction for walking in up, down, left, or right direction with the vertical direction as a reference.

The surface treatment robot is a horizontal surface treatment robot, and the direction sensor is an electronic compass or magnetic compass through which the south direction is determined as the reference direction.

The remote control instructions comprise an instruction for walking in the east, west, south or north direction with the south direction as a reference.

In conclusion, the present invention determines a directional reference by providing different direction sensors in different surface treatment robots, and then determines at least four walking directions of the surface treatment robot based on the direction reference, and enables the buttons on a remote controller to correspond to the walking directions of the surface treatment robot in a one-to-one manner. When shortly or long pressing any button on the remote controller, the robot can automatically adjust to walk in a corresponding direction regardless of the motion state of the surface treatment robot. Thus, the manipulation is convenient and the working efficiency is high.

Hereinafter, the technical solution of the present invention will be described in detail with reference to the accompanying drawings and specific embodiments.

DESCRIPTION OF ATTACHED DRAWINGS

Figure 2:
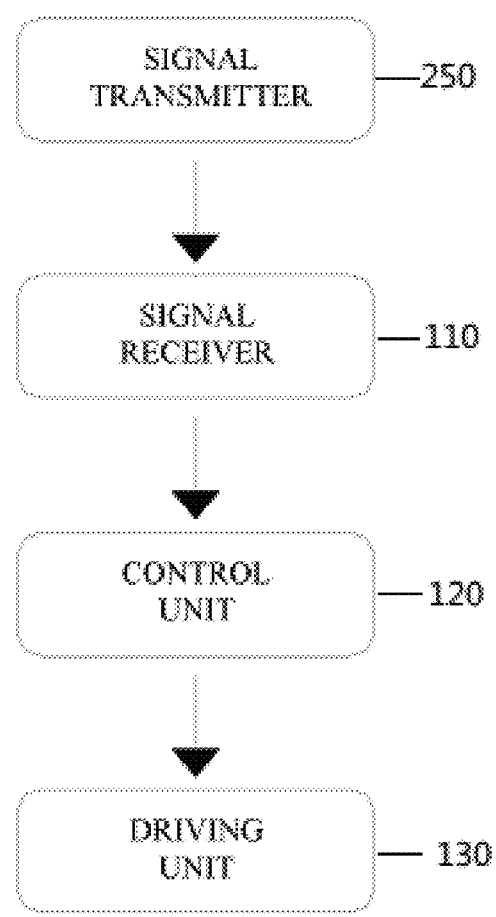

FIG. 1 is a schematic view of signal transmission between a window cleaning robot and a remote controller; and FIG. 2 is a schematic flow diagram of the working principle of a remote controller.

DETAILED DESCRIPTION OF PREFERRED EMBODIMENTS

The First Embodiment

The present embodiment provides a surface treatment robotic system that is a tilted surface treatment robotic system, comprising a tilted surface treatment robot and a remote controller. Hereinafter, a window-cleaning robot will be described as an example of the tilted surface treating robot. FIG. 1 is a schematic view of signal transmission between the window cleaning robot and the remote controller; and FIG. 2 is a schematic flow diagram of the working principle of the remote controller. As shown in FIG. 1 in combination with FIG. 2, the present embodiment provides a window cleaning robotic system 10 comprising a window cleaning robot 100 and a remote controller 200. The window cleaning robot 100 includes a control unit 120 for receiving remote control instructions from the remote controller 200 and performing corresponding actions and a driving unit 130. Further, the window cleaning robot 100 is provided thereon with a gravity sensor 300 for determining a reference direction. The gravity sensor 300 is coupled to the control unit 120 and transmits a vertical direction determined by the gravity sensor 300 to the control unit 120 as the reference direction. The remote controller 200 is provided therein with a signal transmitter 250, while the window cleaning robot 100 is provided therein with a signal receiver 110 correspondingly. The window cleaning robot 100 receives signals transmitted from the remote controller 200 and transfers the signals to the control unit 120, and the control unit 120 controls the driving unit to perform corresponding actions by using the vertical direction as a reference and according to the instructions output by the remote controller 200.

In the following, the working process of the present invention will be described in detail with reference to specific embodiments.

The First Embodiment

Now, the window cleaning robot 100 is in turn-on state. Firstly, the gravity sensor 300 provided on the window cleaning robot 100 determines a vertical direction; and determines four directions of up, down, left, and right, which are controlled by four buttons including front button 210, back button 220, left button 230, and right button 240 on the remote controller respectively, for operation of the window cleaning robot 100 by using the vertical direction as a reference. The window cleaning robot 100 receives remote control instructions from the remote controller 200 and conducts corresponding actions. For example, regardless of the direction to which the front end of the window cleaning robot 100 is facing, the window cleaning robot 100 may walk upwards by long pressing the front button 210. During such process, the window cleaning robot 100 can stop immediately upon the button is released at any time. Generally, in addition to the direction buttons, the remote controller 200 is also provided with a stop button. Under the remote control mode of the present embodiment, the stop button on the remote controller 200 can be used to start the robot.

The Second Embodiment

Now, the window cleaning robot 100 is in walking state, and the state of walking upwards is taken as an example. At this time, by shortly pressing any one of the four buttons including front button 210, back button 220, left button 230, right button 240 of the remote controller 200, the window cleaning robot 100 can be controlled to walk towards the corresponding direction with reference to the vertical direction. When the window cleaning robot 100 is desired to turn to walk to the left, the signal transmitter 250 on the remote controller 200 transmits a left walking instruction while the left button 230 is pressed shortly, and the signal receiver 110 on the window cleaning robot 100 receives the corresponding instruction and transfers the same to the control unit 120. The control unit 120 firstly adjusts the position and orientation of the window cleaning robot 100 with reference to the vertical direction determined by the gravity sensor 300 so that the front end thereof can direct to the left, then controls the driving unit 130 to drive the window cleaning robot 100 to walk towards the left. Similarly, when the right button 240 or the back button 220 is pressed shortly, the control unit 120 firstly adjusts the position and orientation of the window cleaning robot 100 until the front end thereof directs to the right or downwards, and then the driving unit 130 drives the window cleaning robot 100 to walk towards the corresponding direction. Obviously, the control unit 120 also can control the window cleaning robot 100 to conduct the action of walking downwards by moving back directly. In the remote control mode of the present embodiment, the walking of the robot can be stopped by using the stop button on the remote controller 200.

As can be known from the above two embodiments, if the user intends the window cleaning robot to move upwards, firstly, a vertical direction is determined by the gravity accelerometer, and the four directions of up, down, left, or right for operation of the window cleaning robot are determined with reference to the vertical direction, and the four directions for operation are controlled by the corresponding four buttons including front button, back button, left button, and right button on the remote controller, respectively. Further, the present invention provides multiple remote control modes, such as a control mode in which the user presses and holds the front button and a control mode in which the user presses the front button shortly. If the robot is not moving upwards at the time when the user long presses the front button, the robot will rotate to the up side in place and then move upwards straightly. If the window cleaning robot faces to the up side at the time when the user long presses the front button, the robot will move upwards directly. During the walking process, the window cleaning robot can stop motion immediately while the front button is released at any time. If the user adopts the mode of pressing the front button shortly, the window cleaning robot will make automatic steering and walk automatically. During the walking process, the user just needs to press the stop button on the remote controller shortly if intending to stop the robot. The functions and the remote control modes of the back, left, right buttons are similar to the above.

The Third Embodiment

The present embodiment provides a horizontal surface treatment robotic system, comprising a horizontal surface treatment robot and a remote controller. In the present embodiment, the horizontal surface treatment robot is a sweeping robot. The sweeping robot is provided with a direction sensor thereon, and the direction sensor may be a magnetic compass or an electronic compass. The electronic compass or magnetic compass can determine the direction of due south, which is used as the reference direction. The sweeping robot comprises a control unit and a driving unit, and the control unit receives remote control instructions from the remote controller and controls the driving unit to perform corresponding actions. The direction sensor is coupled to the control unit, and the electronic compass or magnetic compass transmits the determined reference direction to the control unit. The control unit determines a corresponding walking direction of the robot in accordance with the reference direction, and the walking directions correspond one-to-one to the remote control instructions input from the input terminal of the remote controller. The remote control instructions comprise walking in the direction of the east, the west, the south or the north with a reference of the south direction. Similarly, the four buttons of front button 210, back button 220, left button 230, and right button 240 of the remote controller may be defined to represent command input ends of north, south, west, and east, respectively.

The specific working process of the sweeping robot is described as follows. First, the sweeping robot is in a certain state such as a stationary state immediately after starting up and a motion state during cleaning. At this time, if the sweeping robot is desired to move west, the user may press shortly or press and hold the left button of the remote controller. If the sweeping robot is already in a westward moving state, the sweeping robot may continue moving; and if the sweeping robot is in other directions, with the south direction determined by the electronic compass or magnetic compass as a reference direction, the user may firstly adjust the position and orientation of the sweeping robot until the front end of the robot direct to the direction of the west, then keep shortly or long pressing the left button of the remote controller so that the sweeping robot can continue walking in the direction of the west.

The present embodiment also comprises multiple remote control modes such as a control mode in which the user controls the walking by pressing and holding a button and stops the walking by releasing the button and a control mode in which the walking is controlled by pressing buttons shortly and the walking is stopped by pressing a stop button shortly.

The up, down, left, or right directions or the east, west, south or north directions listed in the above embodiment are due directions, however, by subdividing the angles, the walking control for the surface treatment robotic system in other directions other than the due directions may also be achieved. For example, in the second embodiment, the instructions for southeast direction or northwest direction may be added.

In conclusion, the present invention determines a directional reference by providing different direction sensors in different surface treatment robots, and then determines at least four walking directions of the surface treatment robot based on the directional reference, and enables the buttons on a remote controller to correspond to the walking directions of the surface treatment robot in a one-to-one manner. When shortly or long pressing any button on the remote controller, the robot may automatically adjust to walk in a corresponding direction regardless of the motion state of the surface treatment robot. Thus, the manipulation is convenient and the working efficiency is high.

The invention claimed is:

1. A surface treatment robotic system, comprising a surface treatment robot and a remote controller, wherein the surface treatment robot comprises a control unit and a driving unit, the control unit receives remote control instructions from the remote controller and controls the driving unit to perform corresponding actions, the surface treatment robotic system being characterized in that, the surface treatment robot is provided with a direction sensor for determining a reference direction regardless of a current moving direction of the surface treatment robot;

the direction sensor is coupled to the control unit, and the direction sensor transmits the determined reference direction to the control unit;

the control unit determines a moving direction of the robot by using the reference direction as a reference and according to the remote control instructions input by an input terminal of the remote controller; and the input terminal of the remote controller is provided with direction buttons, and a moving direction indicated by the direction button is according to the reference direction, wherein the surface treatment robot is a tilted surface treatment robot, and the direction sensor is a gravity sensor through which a vertical direction is determined as the reference direction, and when the surface treatment robot is a horizontal surface treatment robot, the remote control instructions comprise an instruction for walking in the east, west, south or north direction with the south direction as a reference.

2. A surface treatment robotic system of claim 1, characterized in that, the input terminal for inputting the instructions of the remote controller comprises at least four direction buttons configured to input the respective remote control instructions, the remote control instructions being corresponding one-to-one to four moving directions, including the front, the back, the left, and the right moving directions set based on the reference direction, of the surface treatment robot.

3. A surface treatment robotic system of claim 1, characterized in that, the remote control instructions comprise an instruction for walking in up, down, left, or right direction with the vertical direction as a reference.

4. A surface treatment robotic system of claim 1, characterized in that, when the surface treatment robot is the horizontal surface treatment robot, the direction sensor is an electronic compass or magnetic compass through which the south direction is determined as the reference direction.

* * * * *